United States Patent
Roos

(10) Patent No.: US 9,500,514 B2
(45) Date of Patent: Nov. 22, 2016

(54) ESTIMATION OF WEIGHT FOR A VEHICLE

(75) Inventor: Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 547 days.

(21) Appl. No.: 14/008,218

(22) PCT Filed: Mar. 26, 2012

(86) PCT No.: PCT/SE2012/050329
§ 371 (c)(1),
(2), (4) Date: Sep. 27, 2013

(87) PCT Pub. No.: WO2012/134377
PCT Pub. Date: Oct. 4, 2012

(65) Prior Publication Data
US 2014/0156222 A1  Jun. 5, 2014

(30) Foreign Application Priority Data

Apr. 1, 2011 (SE) ...................................... 1150287

(51) Int. Cl.
*G01G 19/08* (2006.01)
*B60T 8/172* (2006.01)
*B60W 40/13* (2012.01)
*B60W 50/00* (2006.01)

(52) U.S. Cl.
CPC ............. *G01G 19/086* (2013.01); *B60T 8/172* (2013.01); *B60T 2250/02* (2013.01); *B60W 40/13* (2013.01); *B60W 2050/0051* (2013.01); *B60W 2510/0657* (2013.01); *B60W 2550/142* (2013.01); *B60W 2550/402* (2013.01)

(58) Field of Classification Search
CPC .................................................. G01G 19/086
USPC ......................................................... 702/175
See application file for complete search history.

(56) References Cited

U.S. PATENT DOCUMENTS

| | | | |
|---|---|---|---|
| 5,434,780 A | 7/1995 | Kume et al. ................ | 364/424.1 |
| 6,314,383 B1 | 11/2001 | Leimbach et al. ............ | 702/173 |
| 6,446,024 B1 | 9/2002 | Leimbach et al. ............ | 702/141 |
| 7,363,116 B2 * | 4/2008 | Flechtner ............... | B60W 40/13 303/121 |
| 7,536,272 B2 * | 5/2009 | Leminoux ............ | G01G 19/086 701/124 |
| 2004/0181317 A1 | 9/2004 | Flechtner et al. ................ | 701/1 |
| 2005/0065695 A1 | 3/2005 | Grieser ........................... | 701/70 |
| 2010/0235039 A1 | 9/2010 | Kajigai et al. .................. | 701/29 |

FOREIGN PATENT DOCUMENTS

| | | |
|---|---|---|
| EP | 1298020 A1 | 4/2003 |
| JP | 2009-162740 | 7/2009 |

OTHER PUBLICATIONS

International Search Report mailed Jul. 9, 2012 in corresponding PCT International Application No. PCT/SE2012/050329.
Russian Federation Official Action, dated Feb. 18, 2015, issued in corresponding Russian Federation Patent Application No. 2013148741/11(075819). English translation. Total 6 pages.

* cited by examiner

*Primary Examiner* — Bryan Bui
(74) *Attorney, Agent, or Firm* — Ostrolenk Faber LLP

(57) ABSTRACT

A method and a system for estimating a weight $m_v$ for a vehicle on the basis of at least two forces which act upon the vehicle, the forces are a motive force $F_T$ and at least one further force, and topographical information for a relevant section of road. The estimation is performed when the at least two forces are dominated by the motive force $F_T$.

21 Claims, 2 Drawing Sheets

ESTIMATION OF WEIGHT FOR A VEHICLE

CROSS-REFERENCE TO RELATED APPLICATIONS

The present application is a 35 U.S.C. §§371 national phase conversion of PCT/SE2012/050329, filed Mar. 26, 2012, which claims priority of Swedish Application No. 1150287-9, filed Apr. 1, 2011, the contents of which are incorporated by reference herein. The PCT International Application was published in the English language.

TECHNICAL FIELD

The present invention relates to a method for estimating a weight $m_V$ for a vehicle. The invention relates also to a system for estimating a weight $m_V$ for a vehicle, and to a computer program for applying the method.

BACKGROUND

A weight of a vehicle, which may take the form of a vehicle train, is an important parameter in many functions in its control system. A vehicle is considerably affected by its weight in many situations, so it is very important to be able to estimate it correctly. Its weight typically forms part of models of the vehicle which are used for sundry calculations and forms of control in the vehicle.

The weight of a vehicle capable of carrying heavy loads, e.g. a bus capable of carrying a large number of people or a truck capable of carrying various types of heavy loads, may vary considerably. For example, a truck weighs considerably less when unladen than when fully laden. A bus likewise weighs considerably less when empty than when full of passengers. Variations in the weight of a car are considerably smaller than in the case of vehicles intended to carry heavy loads, but the difference between a car empty and fully laden, especially when a fully laden car may also have a laden trailer coupled to it, may be large relative to the low weight of the car itself.

The weight of a vehicle affects its running resistance and is therefore an important parameter in, for example, automatic gear choice. Automatic gear choice takes place, for example, in an automatically operated manual gearbox, for which it is important to be able to determine an actual running resistance and hence which gear to choose in a given situation.

Now the topography of a section of road affects a vehicle also depends greatly on the vehicle's weight, which is a decisive factor in how much it respectively accelerates and decelerates downhill and uphill. Vehicle weight is therefore also an important parameter in cruise controls which take the topography of a road section into account, so-called look-ahead cruise controls, in which the amount of engine torque employed in a situation depends on how the topography of road sections ahead will affect the vehicle's speed. The vehicle's weight is of course also an important parameter in conventional cruise controls.

Various methods are currently applied to estimate a vehicle's weight. One such method uses information from an air suspension system of the vehicle. The air suspension system measures axle pressures on all of the axles which have air suspension and conveys this information to a control unit as a basis for it to calculate the vehicle's weight. This method works well if there is air suspension on all of the axles, but does not work satisfactorily, or at all, if one or more axles have no air suspension. This method is for example particularly problematical in vehicle trains comprising trailers or semitrailers which do not report axle loads, which may be relatively common in cases where more or less unknown trailers are often coupled to a vehicle train during use of the vehicle. This method is also problematical during operation of the vehicle, since the axle pressure will vary when the vehicle travels over uneven portions of the carriageway, potentially leading to incorrect weight estimation due to unsteady axle pressures.

Other known weight estimation methods are based on acceleration, using the fact that it is possible to calculate the vehicle's weight from a force which the engine imparts to the vehicle and an acceleration resulting from this force. The force from the engine is known in the vehicle but such methods involve having to measure or estimate the acceleration.

According to a method, the acceleration is estimated by making a derivation of the vehicle's speed. This method works well at high accelerations, i.e. in low gears at relatively low vehicle speeds, but a disadvantage is that this method is affected by road gradient, necessitating the derivation, since the road gradient is a parameter unknown to the system.

Another method estimates the acceleration by means of an accelerometer. The accelerometer-based method has an advantage in that acceleration is measured directly, but only a limited, number of today's vehicles have an accelerometer, which means that this method is not generally applicable on all vehicles. The current accelerometer-based method also suffers in that the accelerometer signal is noisy, reducing the accuracy of the method.

Another method estimates the acceleration during gear changes. This method is based on the assumption that the running resistance does not change during a gear change and on therefore comparing the vehicle's acceleration before, during and after gear changes in order to determine its weight. This method results in very unsatisfactory estimates of vehicle weight.

Acceleration-based weight estimates generally have disadvantages in that certain running requirements have to be fulfilled for good estimation to be possible. It is not always certain that these requirements are fulfilled during a run, in which case good weight estimation is not possible. For example, acceleration-based weight estimation requires full acceleration in low gears to achieve a reliable result. As such full acceleration does not always occur during a run, if for example the vehicle begins its run downhill, e.g. on an entry slip from a filling station to a motorway, where the downgrade makes it possible to accelerate relatively gently before maintaining a substantially constant speed for the rest of the journey, these methods often do not provide a good estimate of vehicle weight.

Thus the previous known weight estimation methods are not always applicable and/or fail to provide reliable estimates on every kind of run.

BRIEF DESCRIPTION OF THE INVENTION

An object of the present invention is to provide correct estimates of vehicle weight $m_v$ in a computationally efficient way.

This object is achieved by a method for estimating a weight $m_v$ for a vehicle and is also achieved by a system for estimating a weight $m_v$ for a vehicle, and by a computer program all according to the disclosure hereof.

According to the present invention, estimation of a weight $m_v$ for a vehicle is performed when the result is subject to} minimum influence from sources of error. This is achieved by the invention choosing to make the estimate at times when the motive force $F_T$ dominates the forces which act upon the vehicle. As the motive force $F_T$ is well known and at the same time involves relatively few errors, an estimate which is of good quality is achievable by the invention. In other words, a high-quality estimate can be made, since it is based mainly on the motive force $F_T$ which itself maintains high quality. Making estimates only when they are likely to maintain high quality also greatly limits the amount of calculation involved in such estimation.

According to an embodiment of the invention, estimation is based on at least an effect which the forces have upon the vehicle over a period of time (from $t_0$ to $t_e$, i.e. $t_0$-$t_e$) or distance (from $x_0$ to $x_e$, i.e. $x_0$-$x_e$), on a change in the speed of the vehicle over the period $t_0$-$t_e$ or distance $x_0$-$x_e$, and on a change in its altitude over the period $t_0$-$t_e$ or distance $x_0$-$x_e$. These estimates may be based on an initial vehicle speed $v_0$ and a final vehicle speed $v_e$ at the respective beginning ($t_0$, $x_0$) and end ($t_e$, $x_e$) of the period or distance, which is advantageous in that no derivation of the noisy speed signal need be made, thereby reducing estimation error.

These estimates may be calculated on the basis of integrals over the period $t_0$-$t_e$, thereby also increasing the quality of the estimates, since the integrations serve as a filter for irregularities in the input parameters.

BRIEF DESCRIPTION OF DRAWINGS

The invention is explained in more detail below with reference to the attached drawings, in which the same reference notations are used for similar items, and in which.

DESCRIPTION OF PREFERRED EMBODIMENTS

Figure 1:
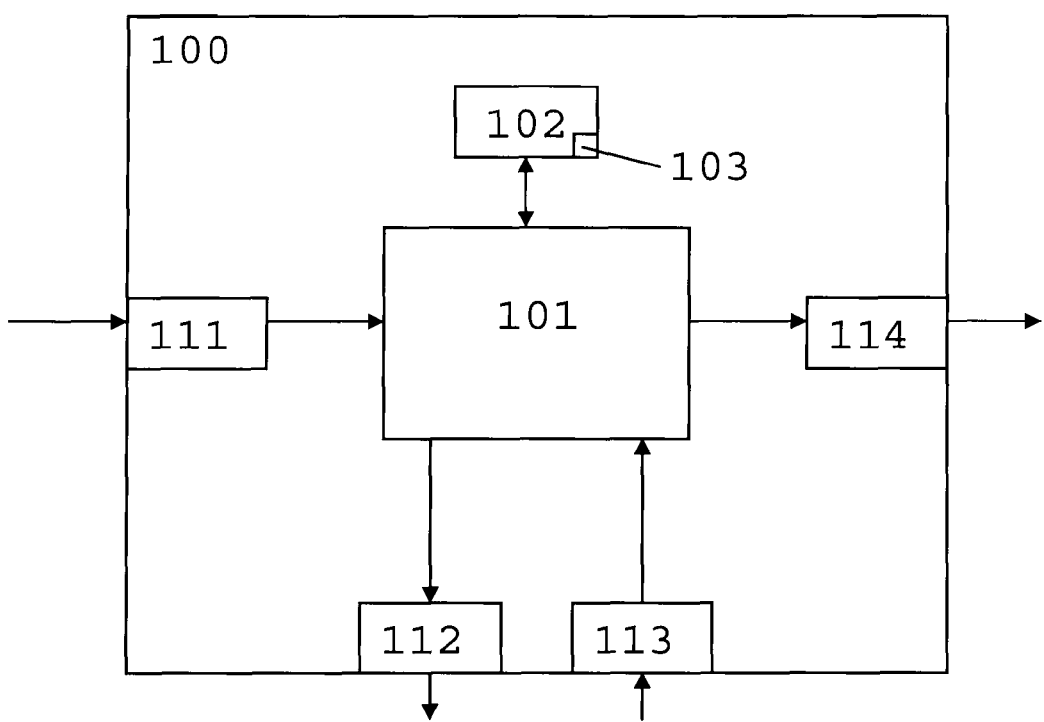
FIG. 1 depicts a control unit.

Various forces act upon a vehicle when it is in motion. One of them is a motive force $F_T$ which propels the vehicle forwards, or rearwards when the vehicle is reversing. Further such forces comprise one or more from among a force $F_R$ related to rolling resistance, a force $F_A$ related to air resistance and a force $F_G$ related to gravitation. The road gradient $\alpha$ also greatly affects the vehicle's running resistance.

Estimating a weight $m_v$ for a vehicle is therefore based, according to the present invention, on the motive force $F_T$ and at least one further force from among the rolling resistance force $F_R$, the air resistance force $F_A$ and the gravitation force $F_G$, and on topographical information for a relevant section of road. From the topographical information it is possible to determine an effect of the road gradient a along a section of road. According to the present invention, estimating the vehicle weight $m_v$ is done when the forces acting upon the vehicle are dominated by the motive force $F_T$. This force dominates the forces which for example act upon the vehicle during strong acceleration, which may occur in low gears, or when the vehicle is maintaining high speed uphill.

Estimating the vehicle weight $m_v$ over a period of time $t_0$-$t_e$ or distance $x_0$-$x_e$ when the motive force $F_T$ is the dominant force acting upon the vehicle makes it possible to achieve an estimate with good accuracy, since the magnitude of the motive force $F_T$ for the vehicle is certainly known. In the vehicle there is thus access to highly accurate information about the motive force $F_T$. In contrast, information available in the vehicle about the other forces which act upon it, e.g. about the running resistance force $F_R$ and the air resistance force $F_A$, is of low accuracy and often includes errors. The further forces are often estimated on the basis of a model for a standard vehicle which may differ from the specific vehicle for which the vehicle weight $m_v$ is to be estimated. Weather and the state of the road also affect the running resistance force $F_R$ and the air resistance force $F_A$, with consequently significant uncertainty about the magnitude of these forces.

Incorporating also the topographical information in the estimation means that gravitation forces $F_G$ arising for example from steep upgrades are taken into account when estimating the vehicle weight $m_v$, with the result that estimation can for example also be performed when the vehicle is not accelerating but still maintaining high speed uphill. All in all, the present invention is based on choosing to make a vehicle weight estimate when the forces acting upon the vehicle are dominated, by the motive force $F_T$ which is known with good accuracy within the vehicle, affording assurance of a very accurate estimate. Inferior estimates are thereby avoided and reliable estimates are achieved using a minimum of computation capacity.

According to an embodiment of the present invention, the at least two forces acting the vehicle are assumed to be dominated by the motive force $F_T$ if it is considerably greater than the one or more further forces acting upon it. Estimating the vehicle weight $m_v$ should according to the present invention be done when such is the case.

According to an embodiment of the present invention, the motive force $F_T$ is assumed to be considerably greater than the one or more further forces if the torque M extracted at the time from an engine of the vehicle exceeds a predetermined proportion of a maximum torque $M_{Max}$ which the engine can deliver. This may also be seen as the motive force $F_T$ being regarded as considerably greater than the one or more further forces if it exceeds at the time a predetermined proportion of a maximum motive force $F_{T\,max}$ in a current gear. This makes it easy to decide when or whether an estimate of the vehicle weight $m_v$ is to be made.

According to an embodiment of the invention, the motive force $F_T$ is regarded as considerably greater than the one or more further forces if the torque M extracted at the time from the vehicle's engine exceeds 90% of its maximum torque $M_{Max}$.

This predetermined proportion may be an adjustable value, in which case it can be altered so that estimation is performed any suitable number of times per run. In other words, the proportion is here predetermined for a certain run length but may be adjusted in magnitude for different run lengths. This adjustable value makes it easy to achieve any desired suitable number. What level this value is to be adjusted to may depend on various factors. It will generally be adjusted in such a way as to achieve a balance between the number of estimates made and their quality. A lower level for the adjustable value means that estimates are made when the motive force $F_T$ is less dominant than would be necessary for making an estimate at a higher level of the adjustable value, leading to more estimates being made but with potentially some variation in their accuracy. A higher lower level for the adjustable value results in fewer estimates but high accuracy.

According to another embodiment of the invention, the magnitude of the motive force $F_T$ is related to that of the one or more further forces which act upon the vehicle. In this case the motive force $F_T$ is regarded as considerably greater than these one or more further forces if it is at least a predetermined number of times greater than the at least one further force. Here the motive force $F_T$ has therefore to be a predetermined number of times greater than one or more from among the rolling resistance force $F_R$, the air resistance force $F_A$ and the gravitation force $F_G$ which act upon the vehicle for estimation of the vehicle weight $m_v$ to be performed, and the predetermined number may be so determined that the estimate is guaranteed to be of high quality. For example, the motive force $F_T$ may be regarded as dominant if it is at least three (3) times greater than the one or more further forces which act upon the vehicle, in which case estimation of the vehicle weight $m_v$ is to be performed. The predetermined number need of course not be a whole-number multiple but may be any suitable number, e.g. a fraction. Thus the motive force $F_T$ may for example also be regarded as dominant if it is at least two and half (2.5) times greater than the one or more further forces which act upon the vehicle.

This predetermined number may be an adjustable value, in which case it is predetermined for a certain run length but may be adjusted in magnitude for different run lengths. Like the predetermined proportion above, this predetermined adjustable value may then be altered so that estimation is performed any suitable number of times per run. A low level for this adjustable value leads to more estimates being made but their accuracy potentially varying somewhat. A high lower level for this adjustable value results in fewer estimates but high accuracy.

Previous known methods for estimation of the vehicle weight $m_v$ have used the vehicle's acceleration a, determined by derivation of the vehicle's speed. The vehicle speed signal may be relatively noisy, potentially resulting in its derivative being very noisy. The previous known methods therefore do not produce accurate estimates of the vehicle weight $m_v$.

Force equations for the vehicle may be set up as follows:

$$F_{tot} = m_v a$$

$$F_{tot} = F_T + F_R + F_A + F_G$$

$$F_T = T_E \eta_{DT}$$

$$F_A = k_1 v^2$$

$$F_R = (k_2 v + k_3 v^2 + k_4) m_v g = F_{RC} m_v g$$

$$F_G = m_v g \sin \alpha \quad \text{(eq. 1)}$$

in which
$F_{tot}$ is all of the forces which act upon the vehicle;
p is the gravitational constant;
$\alpha$ is the road gradient in radians;
v is the vehicle speed;
$\eta_{DT}$ is the total transmission ratio of the power train, including wheel radius;
$T_E$ is the engine's output torque;
a is the vehicle acceleration, derived from the vehicle speed v;
$k_1$, $k_2$, $k_3$, $k_4$ are constants; and
$F_{RC}$ is a coefficient for the rolling resistance force (which depends on the vehicle speed v).

These equations may be rewritten to produce an expression for calculating the vehicle's weight:

$$F_T + F_R + F_A + F_G = m_v a \Rightarrow \quad \text{(eq. 2)}$$

$$F_T + F_{RC} m_v g + + F_A m_v g \sin\alpha = m_v a \Rightarrow$$

$$m_v(a - g F_{RC} - g\sin\alpha) = F_T + F_A \Rightarrow$$

$$m_v = \frac{F_T + F_A}{a - g F_{RC} - g\sin\alpha}$$

As mentioned above and as also indicated by equation 2, previous known methods use a signal for the acceleration a which is determined by derivation of the vehicle speed. The speed signal is noisy, resulting in its derivative being very noisy and the estimation of the vehicle weight $m_v$ being inaccurate.

An embodiment of the present invention bases estimating the vehicle weight $m_v$ on the effect which the at least two forces, i.e. the motive force $F_T$ and one or more further forces which act upon the vehicle, have upon the vehicle over a period of time $t_0$-$t_e$ which has a length within a permissible time range, i.e. the period $t_0$-$t_e$ is longer than a shortest permissible time but shorter than a longest permissible time. The same embodiment also bases estimating the vehicle weight $m_v$ on a change in the vehicle's speed over the period $t_0$-$t_e$ and on a change in its altitude over the same period.

As the estimate depends in this case on a change in vehicle speed, i.e. on a difference between an initial speed $v_0$ and a final speed $v_e$, it is sufficient here to determine an initial value $v_0$ and a final value $v_e$ for the vehicle speed, resulting in computationally efficient estimation.

In this case it is therefore sufficient to determine for the vehicle speed an initial value $v_0$ and a final value $v_e$ and to determine the difference between them, with consequently no need to make a derivation of the speed v in order to arrive at the acceleration a. This embodiment thus avoids estimation based on noisy and error-generating acceleration signals. This will become clear below.

The aforesaid period of time $t_0$-$t_e$ over which the effect of the forces upon the vehicle is determined may also correspond to a distance $x_0$-$x_e$ travelled over the same period which has a length within a permissible distance range such that it is longer than a shortest permissible distance but shorter than a longest permissible distance. Estimating the vehicle weight $m_v$ is also based on a change in the speed of the vehicle over the distance $x_0$-$x_e$ and on a change in its altitude over the same distance.

Here again estimation may be based on an initial value $v_0$ and a final value $v_e$ for the vehicle's speed, resulting in computationally efficient estimation. Nor is derivation of the speed v needed to arrive at the acceleration a, resulting in estimation of high quality.

According to an embodiment of the invention, the change in altitude is determined on the basis of a gradient $\alpha$ on a relevant section of road. In this case the respective initial and final values for the vehicle's altitude are therefore determined on the basis of information related to the road gradient $\alpha$.

The road gradient $\alpha$ may here be determined on the basis of topographical map information in combination with positioning information. Maps containing topographical information, e.g. information about the gradient $\alpha$ and/or altitude above sea level of different parts of a section of road, may here be used in conjunction with positioning information which indicates where on the map the vehicle is at the time, thereby also providing a value for the road gradient $\alpha$. Such positioning information is for example obtainable by using GPS (global positioning system) or similar systems.

According to an embodiment of the invention, the vehicle weight $m_v$ may be calculated as follows when the road gradient $\alpha$ is determined by means of information from map data and GPS information:

$$m_v = \frac{\int_{t_0}^{t_e}(F_T + F_A)dt}{\int_{t_0}^{t_e}(a - gF_{RC} - g\sin\alpha)dt} = \frac{\int_{t_0}^{t_e}(F_T + F_A)dt}{(v_e - v_0) - \int_{t_0}^{t_e}(gF_{RC} + g\sin\alpha)dt} \quad \text{(eq. 3)}$$

As mentioned above, an advantage of this embodiment is that the acceleration a in the equation for the estimate is replaced by the final speed $v_e$ minus the initial speed $v_0$. Derivation of the noisy speed signal is thus avoided, thereby improving the quality of the estimate. As indicated above, equation 3 may also be set up for a distance $x_0$ to $x_e$ instead of for the period $t_0$ to $t_e$.

According to an embodiment of the invention, the road gradient $\alpha$ is determined on the basis of information provided by an accelerometer. When accelerometer information is used, the vehicle weight $m_v$ may be determined as follows:

$$m_v = \frac{\int_{t_0}^{t_e}(F_T + F_A)dt}{\int_{t_0}^{t_e}(\text{accelerometer} - gF_{RC})dt} \quad \text{(eq. 4)}$$

The accelerometer cannot distinguish between the vehicle acceleration a and the component of the gravitational acceleration g which acts in the accelerometer's direction. It therefore measures both the gravitational acceleration g and the vehicle acceleration a. This makes it possible to delete in equation 4 a term from equation 3. As indicated above, equation 4 may also be set up for a distance $x_0$ to $x_e$ instead of for the period $t_0$ to $t_e$.

According to an embodiment of the invention, estimation of the vehicle weight $m_v$ is based on a change in altitude between an initial point and a final point.

The vehicle's change in altitude, i.e. the difference between an initial altitude and a final altitude, may be determined on the basis of topographical map data in combination with positioning information.

The change in altitude between an initial point and a final point may also be determined on the basis of the road gradient $\alpha$ for a relevant section of road. Where the gradient $\alpha$ and the time and/or distance over which the vehicle travels are known, the altitude difference is relatively easy to determine. As described above, the road gradient $\alpha$ may be determined on the basis of topographical map information in combination with positioning information or on the basis of information from an accelerometer.

The change in altitude between an initial point and a final point may also be determined on the basis of a change in atmospheric pressure acting upon the vehicle. In this case a first measurement of atmospheric pressure is taken at the initial point and a second measurement at the final point, thereby revealing the altitude change.

According to an embodiment of the invention, the following expression may be used for estimating vehicle weight on the basis of altitude change determined for example on the basis of map data or atmospheric pressure as described above:

$$\Delta E_K + \Delta E_P + E_L = \int_{x_0}^{x_e} F_T dx \quad \text{(eq. 6)}$$

in which
$\Delta E_K$ is the difference in kinetic energy;
$\Delta E_P$ is the difference in potential energy;
$E_L$ is loss energy; and $$\int_{x_0}^{x_e} F_T dx$$

is propulsion work performed over the distance from the initial point $x_0$ to the final point $x_e$.

Thus the difference in kinetic energy plus the difference in potential energy plus loss energy has to be equal to the propulsion work performed over the distance $x_0$-$x_e$.

The loss energy may also be expressed as $$E_L = \int (F_R + F_A)dx = \int F_A dx + m_v \int g F_{RC}(v)dx. \quad \text{(eq. 7)}$$

The difference in kinetic energy may be expressed as $$\Delta E_K = m_v \left(\frac{v_e^2 - v_0^2}{2}\right) \quad \text{(eq. 8)}$$

The difference in potential energy may be expressed as $$\Delta E_P = m_v g \Delta h \quad \text{(eq. 9)}$$

in which
$\Delta h$ is the difference in altitude between the initial point $x_0$ and the final point $x_e$.

According to an embodiment of the invention, the vehicle weight $m_v$ then arrived at is $$m_v = \frac{\int_{x_0}^{x_e}(F_T - F_A)dx}{\left(\frac{v_e^2 - v_0^2}{2}\right) + g\Delta h + \int_{x_0}^{x_e} g F_{RC}(v)dx} \quad \text{(eq. 10)}$$

Equations 3, 4 and 10 all indicate ways of estimating the vehicle weight $m_v$ on the basis of integration over a period of time $t_0$ to $t_e$ or distance $x_0$ to $x_e$. An advantage of basing estimates on integrals of the forces is that calculating the estimate actually serves as a filter for irregularities. As the estimates here integrate over a relatively long period $t_0$-$t_e$ or relatively long distance $x_0$-$x_e$, they are affected very little by temporary errors due for example to noise pertaining to the road gradient $\alpha$, the vehicle speed or some other parameter. The procedures presented above for estimating the vehicle weight $m_v$ are therefore relatively insensitive to irregularities.

As mentioned above, estimates will be made when the motive force $F_T$ is large relative to other forces, since knowledge of and accuracy for the motive force $F_T$ are greater than for other forces. Estimation may for example be performed when the engine torque M is over 90% of a maximum engine torque $M_{max}$ or when $F_T > x(F_A + F_R)$. The magnitude of x directly determines here how many estimates will be performed over the period/distance and their quality. Large values for x result in estimates which are of good quality but few in number. Sources of error are therefore minimised by the invention by making estimates, i.e. calculating the algorithm, at times when we know that the sources of error are small relative to the signals for which we have good knowledge. The initial point $t_0$ thus becomes here the point in time where the condition that the motive force $F_T$ is dominant relative to other forces is fulfilled. The final point $t_e$ becomes the point in time where the condition is no longer fulfilled or a longest permissible time for the period $t_0$-$t_e$ is reached.

According to an embodiment, for an estimate (a calculation) to be regarded as reliable it has to cover more than a shortest permissible time (or more than a shortest permissible distance). It has also to cover less than a maximum permissible time for less than a maximum permissible distance), which reduces the number of calculations if the condition is fulfilled over a long time/distance. According to an embodiment, the shortest permissible time is 6 seconds and the longest permissible time 30 seconds. Alternatively, the shortest and longest permissible times are of the order of 6 and 30 seconds respectively. The calculations are thus here confined to covering a maximum of less than about 30 seconds per calculation.

One skilled in the art will appreciate that the equations set out above for estimating the vehicle weight $m_v$ may also be replaced in whole or in part by summations of discrete values for the parameters concerned instead of integrations of continuous values for them.

According to an embodiment of the invention, when an estimate of the vehicle weight $m_v$ has been made it is stored in a memory. When more than one estimate of the vehicle weight $m_v$ has been made, they are averaged to arrive at an average vehicle weight $m_m$. The more than one estimate of the vehicle weight $m_v$ may also be used to arrive at a median value for the vehicle weight $m_v$, or some other kind of averaging or filtering to even out individual weight value deviations may be applied.

According to an embodiment of the present invention, each of the estimates is given a classification indicating how reliable it is. This classification may for example be determined on the basis of how large the engine torque M is relative to the maximum engine torque $M_{max}$ or on how large y is in the equation $$y = \frac{F_T}{F_A + F_R},$$

i.e. how large the motive force $F_T$ is relative to the aggregate of the air resistance force $F_A$ and the rolling resistance force $F_R$. This classification may then be used to assess the quality of estimates made.

This classification may be used to decide whether further estimates are to be made and/or stored. According to an embodiment, another estimate of the vehicle weight $m_v$ is only stored in the memory if its classification is higher than that of an already stored estimate. According to an alternative, another estimate of the vehicle weight $m_v$ is also stored in the memory if it reaches substantially the same level of classification as an estimate already stored.

According to another embodiment, other estimates are only made if the prospects for an estimate of a higher class than that of an estimate already stored in the memory are good, in which case only estimates likely to be of good quality are made, with a consequently consistently high level of computational efficiency for estimates of the vehicle weight $m_v$. Whether estimates are likely to be of high quality may here be decided on the basis of how large the engine torque M is relative to the maximum engine torque $M_{max}$, or how large the motive force $F_T$ is relative to the aggregate of the air resistance force $F_A$ and the rolling resistance force $F_R$, as described above with regard to classification of estimates.

One skilled in the art will appreciate that the method for estimating the vehicle weight $m_v$ according to the present invention may also be implemented in a computer program which, when executed in a computer, causes the computer to apply the method. The computer program usually takes the form of a computer program product 103 (depicted in FIG. 1) stored on a digital storage medium, and is contained in such a product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

FIG. 1 depicts schematically a control unit 100 comprising a calculation unit 101 which may take the form of substantially any suitable type of processor or microcomputer, e.g. a circuit for digital signal processing (digital signal processor, DSP), or a circuit with a predetermined specific function (application specific integrated circuit, ASIC). The calculation unit 101 is connected to a memory unit 102 which is situated in the control unit 100 and which provides the calculation unit with, for example, the stored program code and/or stored data which the calculation unit needs to enable it to do calculations. The calculation unit 101 is also adapted to storing partial or final results of calculations in the memory unit 102.

The control unit 100 is further provided with respective devices 111, 112, 113, 114 for receiving and sending input and output signals. These input and output signals may comprise waveforms, pulses or other attributes which the input signal receiving devices 111, 113 can detect as information and which can be converted to signals processable by the calculation unit 101. These signals are thereafter conveyed to the calculation unit 101. The output signal sending devices 112, 114 are arranged to convert signals received from the calculation unit 101 in order, e.g. by modulating them, to create output signals which can be conveyed to other parts of the vehicle's control system, to systems for gear choice or to look-ahead cruise controls.

Each of the connections to the respective devices for receiving and sending input and output signals may take the form of one or more from among a cable, a data bus, e.g. a CAN (controller area network) bus, an MOST (media oriented systems transport) bus or some other bus configuration, or a wireless connection.

One skilled in the art will appreciate that the aforesaid computer may take the form of the calculation unit 101 and that the aforesaid memory may take the form of the memory unit 102.

The present invention relates also to a system for estimating the vehicle weight $m_v$. This system is adapted to basing estimation on a motive force $F_T$ and at least one further force, and on topographical information for a relevant section of road. The system according to the present invention comprises means for comparing the motive force $F_T$ and the at least one further force. The system is further adapted to making estimates when the at least two forces which act upon the vehicle, i.e. the motive force $F_T$ and the at least one further force, are dominated by the motive force $F_T$.

According to an embodiment of the invention, the means for making the comparison is adapted to determining that the motive force $F_T$ is dominant if it is considerably greater than the at least one further force.

Using the system according to the invention results, as described above in relation to the method according to the invention, in estimates which are less influenced by sources of errors because of only being made when they mainly involve signals which the system has knowledge of and which are of high quality.

Figure 2:
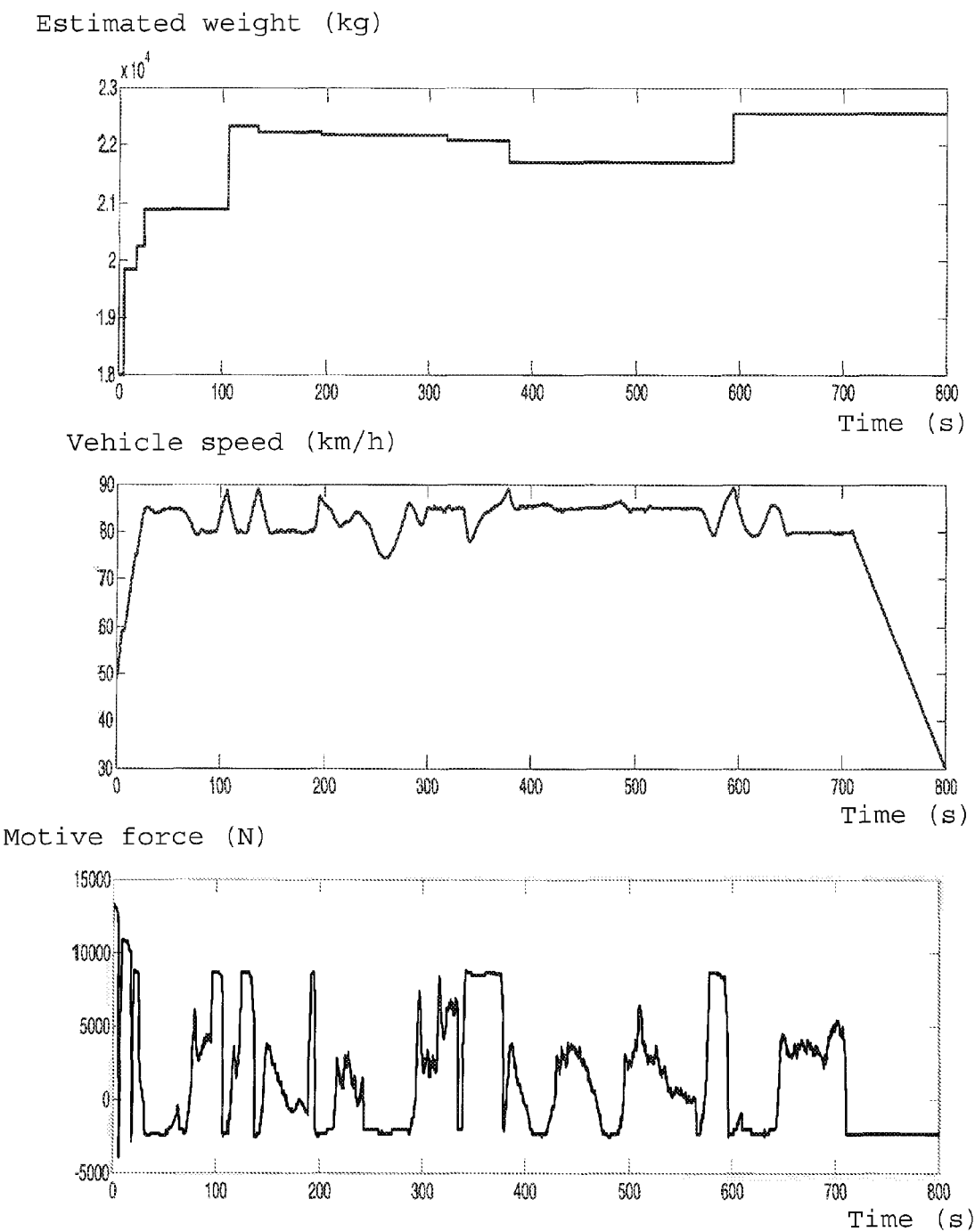
FIG. 2 depicts examples of data measured during a run.

FIG. 2 depicts data from a run where the present invention was used to estimate the vehicle weight $m_v$. The bottom curve represents the motive force $F_T$, the middle curve the vehicle speed v and the top curve the estimate of the vehicle weight $m_v$. As may be seen, the estimate varies between 20,000 and 22,500 kg over large parts of the run. The test vehicle's correct weight $m_v$ during the run was 21,200 kg. Applying the invention thus results in good estimation of the vehicle weight $m_v$. Estimates according to the invention are considerably more accurate than according to previous known methods for estimating the vehicle weight $m_v$.

One skilled in the art will also appreciate that the above system may be modified according to the various embodiments of the method according to the invention. The invention relates also to a motor vehicle, e.g. a truck or bus, provided with at least one system for estimating the vehicle weight $m_v$. The present invention is not restricted to the embodiments of the invention described above but relates to and comprises all embodiments within the protective scope of the attached independent claims.

The invention claimed is:

1. A method for estimating a weight $m_v$ for a vehicle comprising:
    measuring at least two forces which act upon the vehicle, the two forces comprising a motive force $F_T$ of the vehicle and at least one further force, the estimation being based on a further force relating to topographical information for a relevant section of a road on which the vehicle is moving,
    wherein the at least one further force comprises at least one of several forces $F_G$ related to gravitation,
    the estimation takes into account said at least one or several forces $F_G$ related to gravitation,
    the estimation is performed when the at least two forces are dominated by the motive force $F_T$, and
    the estimation is performed based on integration of continuous values or summation of discrete values of input parameters for the estimation over a period of time or distance.

2. The method according to claim 1, wherein the at least one further force further comprises at least one force selected from a force $F_R$ related to rolling resistance and a force $F_A$ related to air resistance on the movement of the vehicle.

3. The method according to claim 1, wherein the motive force $F_T$ is dominant relative to the at least one further force when the motive force $F_T$ is at least a predetermined number of times greater than the at least one further force.

4. The method according to claim 3, wherein the predetermined number of times is an adjustable value which is altered so that the estimation is performed a suitable number of times per run of the vehicle.

5. The method according to claim 3, wherein the number of times is three.

6. The method according to claim 1, further comprising making at least two separate estimates of the weight of the vehicle $m_v$ to determine an averaged weight $m_m$.

7. The method according to claim 1, further comprising classifying the estimation to indicate reliability of the estimation.

8. A computer program which comprises non-transitory program code and which, when the code is executed in a computer, causes the computer to apply the method according to claim 1.

9. A computer program product comprising a non-transitory computer-readable medium and the computer program according to claim 8, wherein the program is contained in said computer-readable medium.

10. A method for estimating a weight $m_v$ for a vehicle comprising:
    measuring at least two forces which act upon the vehicle, the two forces comprising a motive force $F_T$ of the vehicle and at least one further force, the estimation being based on a further force relating to topographical information for a relevant section of a road on which the vehicle is moving,
    wherein the at least one further force comprises at least one of several forces $F_G$ related to gravitation,
    the estimation takes into account said at least one or several forces $F_G$ related to gravitation, and
    the estimation is performed when the at least two forces are dominated by the motive force $F_T$,
    the method further comprising determining that the motive force $F_T$ is dominant relative to the at least one further force if torque M extracted at the time from an engine for the vehicle exceeds a predetermined proportion of a maximum torque $M_{Max}$ of the engine.

11. The method according to claim 10, wherein the predetermined proportion is an adjustable value which is altered so that the estimation is performed a suitable number of times per run of the vehicle.

12. The method according to claim 10, wherein the predetermined proportion is 90% of the maximum torque $M_{Max}$ of the engine.

13. A method for estimating a weight $m_v$ for a vehicle comprising:
    measuring at least two forces which act upon the vehicle, the two forces comprising a motive force $F_T$ of the vehicle and at least one further force, the estimation being based on a further force relating to topographical information for a relevant section of a road on which the vehicle is moving,
    wherein the at least one further force comprises at least one of several forces $F_G$ related to gravitation,
    the estimation takes into account said at least one or several forces $F_G$ related to gravitation, and
    the estimation is performed when the at least two forces are dominated by the motive force $F_T$,
    wherein the estimation is based on at least:
    selecting an effect of the at least two forces on the vehicle over a period of time $t_0$-$t_e$ which has a length within a selected time range;
    a change in speed of the vehicle over the time period $t_0$-$t_e$; and
    a change in altitude of the vehicle over the period $t_0$-$t_e$.

14. The method according to claim 13, in which the time period $t_0$-$t_e$ corresponds to a distance $x_0$-$x_e$ which is travelled over the time period $t_0$-$t_e$ and $x_0$-$x_e$ has a length within a permissible distance range.

15. The method according to claim 13, further comprising determining the change in altitude based on a gradient $\alpha$ of a relevant section of road.

16. The method according to claim 15, further comprising determining the road gradient $\alpha$ based on at least one of:
    topographical map information of a road on which the vehicle is travelling in combination with positioning information of the vehicle on the road; and an accelerometer for measuring acceleration of the vehicle.

17. The method according to claim 13, further comprising determining the change in altitude based on altitude information obtained from topographical map information of a road on which the vehicle is travelling in combination with positioning information of the vehicle on the road.

18. The method according to claim 13, further comprising determining the change in altitude based on a change in atmospheric pressure where the vehicle is travelling over the predetermined period $t_0$-$t_e$.

19. The method according to claim 13, further comprising determining an effect of the at least two forces on the vehicle over the time period $t_0$-$t_e$ by at least one of a plurality of the following calculation methods:
   integrating the effect on the vehicle of the at least two forces over the time period $t_0$-$t_e$;
   summing an effect of the at least two forces over discrete values corresponding to the time period $t_0$-$t_e$;
   integrating the effect of the at least two forces over a travel distance $x_0$-$x_e$ of the vehicle corresponding to the time period $t_0$-$t_e$; and
   summing the effect of the at least two forces over discrete values for a distance $x_0$-$x_e$ of travel of the vehicle corresponding to the time period $t_0$-$t_e$.

20. A system for estimating a weight $m_v$ for a vehicle on the basis of:
   at least two forces which act upon the vehicle, the forces comprising a motive force $F_T$ and at least one further force;
   wherein the system is configured to base the estimation on topographical information for a selected relevant section of a road on which the vehicle is travelling;
   the at least one further force comprises at least one force $F_G$ related to gravitation;
   the system comprises a device configured for comparing the motive force $F_T$ and the at least one further force and the system is further configured, when the system is performing the estimation, to take into account the at least one or several forces $F_G$ related to gravitation;
   the system performs the estimation when the at least two forces are dominated by the motive force $F_T$, and
   the estimation is performed based on integration of continuous values or summation of discrete values of input parameters for the estimation over a period of time or distance.

21. The system according to claim 20, in which the device is further configured for determining that the motive force $F_T$ dominates the at least two forces if the motive force is considerably greater than the at least one further force.

* * * * *